July 25, 1933.  F. A. HAYES  1,919,218
VARIABLE SPEED POWER TRANSMISSION MECHANISM
Original Filed May 7, 1929  2 Sheets-Sheet 1
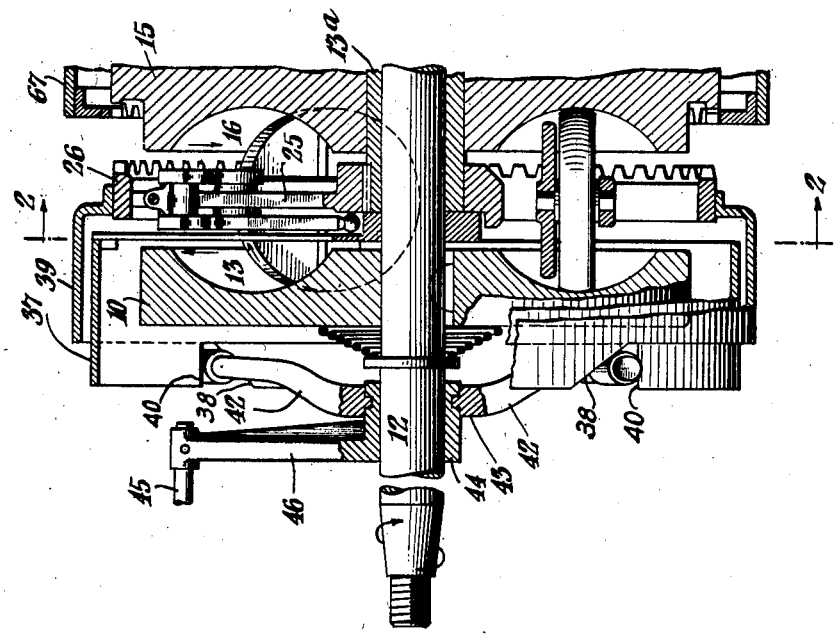
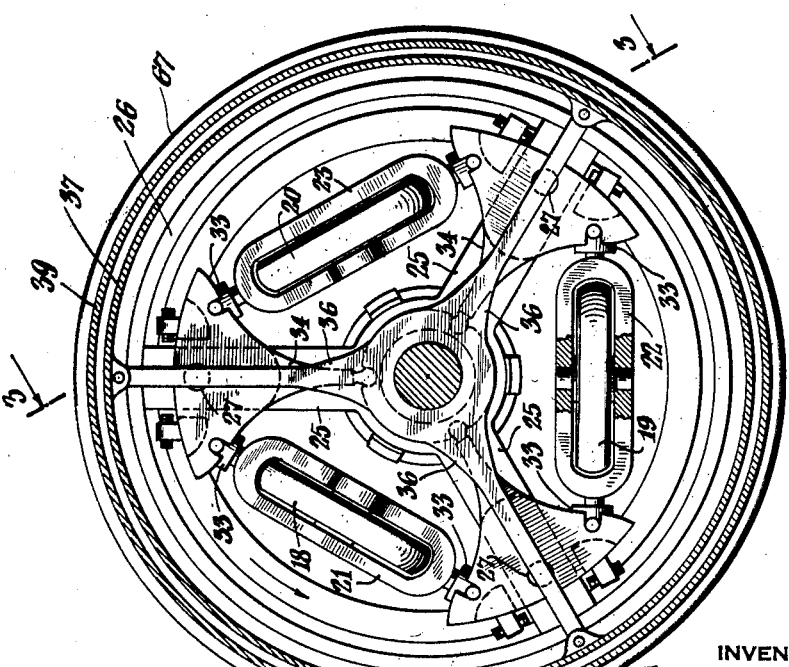
INVENTOR
*Frank A. Hayes*
BY
*Cooper, Kerr & Dunham*
ATTORNEYS

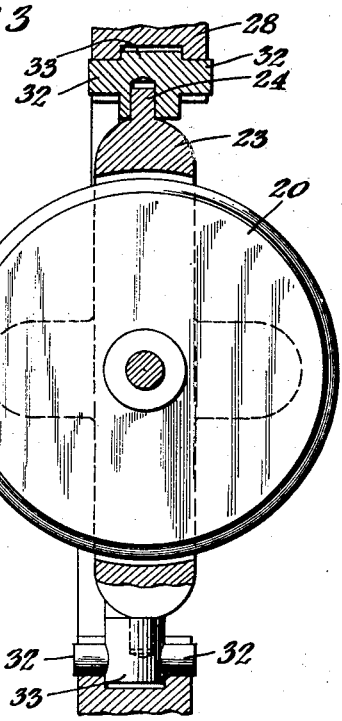
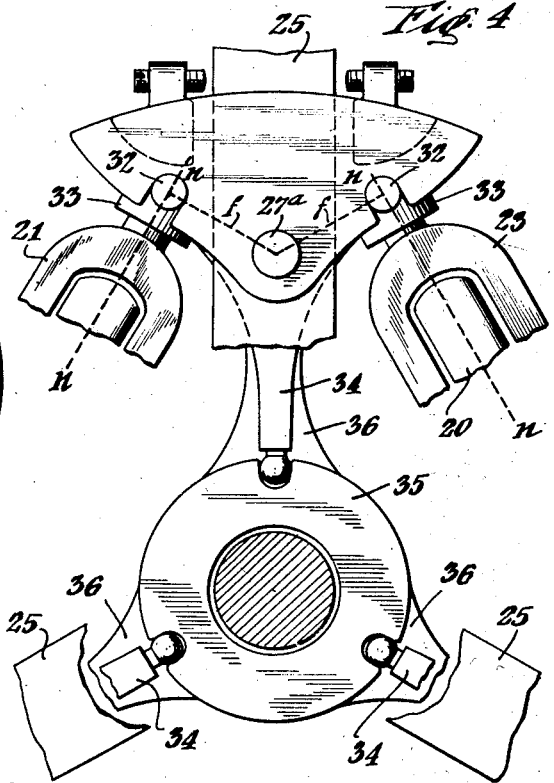
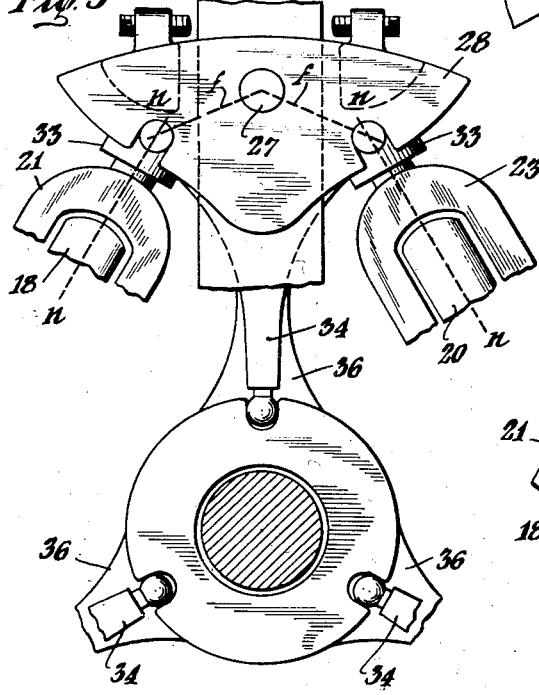
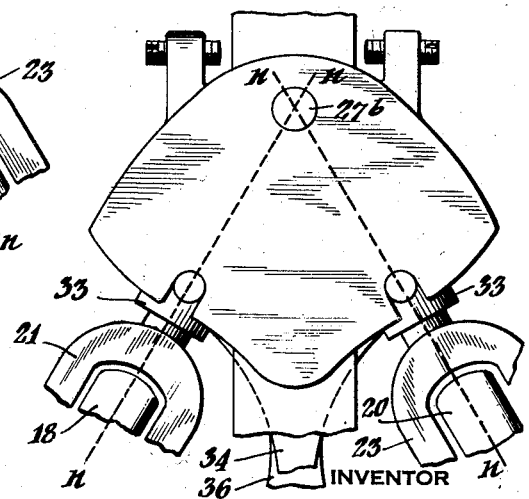

Patented July 25, 1933

1,919,218

UNITED STATES PATENT OFFICE

FRANK A. HAYES, OF MIDDLETOWN, NEW JERSEY

VARIABLE SPEED POWER TRANSMISSION MECHANISM

Original application filed May 7, 1929, Serial No. 361,031. Divided and this application filed February 2, 1932. Serial No. 590,360.

The invention which forms the subject of this application (a division of my copending application Serial No. 361,031, filed May 7, 1929, now Patent No. 1,865,102, issued June 28, 1932, to which reference may be made for a detailed description of the preferred form of mechanism in which the present invention may be employed) relates to variable speed friction transmission mechanisms having toroidally grooved disks and cooperating friction rollers, the latter being capable of angular or rocking adjustment on axes of precession transverse to their axes of rotation to vary the speed-ratio of the mechanism. More particularly the invention relates to mechanisms in which the rollers are supported by carriers which are themselves capable of actuation by pivoted rockers in such manner as to cause the rollers to precess, that is, to take automatically a different angular position with respect to the disks and thereby vary the speed ratio of the mechanism. The movement of the carriers by the rockers may be substantially a displacement, that is, more or less in parallelism with the axes of precession of the rollers; or the movement may be partly displacement and partly tilting in a plane substantially parallel to the disks; or it may be substantially all tilting; according to the positions of the centers on which the rockers swing. In my aforesaid copending application the location of the rocker centers or pivots is claimed broadly, and therein I also claim specifically a construction in which the rocker centers are so located as to give the carriers a displacement movement which is substantially devoid of tilting. The present application is directed to the arrangement of rockers and carriers in which the precession-producing movement has a substantial amount of "tilt", and may be substantially all tilt. One advantage of a substantial amount of tilt is that the rollers by their friction on the disks offer less resistance to the movement of the carriers and rockers necessary to produce a desired precession than when the movement of the carriers is in line with or substantially parallel with the axes of precession.

In general, the resistance of the rollers decreases as the tilting movement increases and the displacement or translational movement decreases, and vice-versa, but this does not mean that the relation between resistance and extent of tilt is necessarily constant.

One form of the invention is illustrated, somewhat diagrammatically, in the accompanying drawings, in which Fig. 1 is a longitudinal vertical section showing two grooved disks and two of the cooperating rollers.

Fig. 2 is a cross section taken on line 2—2 of Fig. 1 and looking in the direction of the arrows.

Fig. 3 is a section on line 3—3 of Fig. 2, looking in the direction of the arrows.

Fig. 4 is a detail view of one of the rockers shown in Fig. 2, but looking from the rear thereof, showing the rocker pivot positioned to give a minimum tilting and maximum shifting movement or displacement of the rocker.

Fig. 5 is a detail view similar to Fig. 4 but showing the rocker pivot positioned to give a large tilting movement to the rocker as well as a substantial shifting movement or displacement.

Fig. 6 is a view similar to Figs. 4 and 5 but showing the rocker pivot positioned to give maximum tilting movement of the rocker.

In the construction illustrated, 10 and 15 are coaxial disks provided with toroidal grooves 13, 16. Disk 10 is keyed on shaft 12, and on the latter is a rotatable sleeve 13a on which disk 15 is mounted. Between the disks are three friction rollers 18, 19, 20, rotatably mounted in carriers 21, 22, 23, pivotally supported at their ends in trunnion-blocks 33 which are themselves mounted by means of trunnions 32 in rockers 28. The rockers are pivoted at 27, Figs. 2 and 5, on the arms 25 of a three-armed spider fixed on the sleeve 13a, and are provided with arms 34 extending radially inward with their ball-ends engaging recesses in the periphery of a collar 35 around shaft 12 and capable of slight rotary and radial movement (in every direction) relative to the shaft. The collar is provided with arms 36 extending radially outward into connection with a concentric ring 37, and the spider arms 25 are at their outer ends connected to a toothed annulus 26 on which is fixed a ring 39. Ring 39 is provided with two inclined edges 38, and ring 37 is provided with axial or uninclined edges 40, these four edges being engaged by two oppositely extending arms 42, on a ring 43 which is rotatable on a collar 44 on shaft 12. The collar is shiftable axially on the shaft and may be so moved by the arm 46 and actuating rod 45.

A drum 67, coaxial with the disks, is shown in toothed engagement with disk 15. This drum may be shifted axially out of engagement with disk 15 and into engagement with the teeth on annulus 26, or into a neutral position in which it engages neither annulus nor disk. It will be evident that if when the drum is connected with the disk the drum be held from rotating, then the disk is also prevented from rotating and hence the rotation of the shaft 12 and disk 10 will cause the rollers to revolve in planetary fashion, thereby rotating sleeve 13a, which latter may be connected to a driven member in any suitable manner (not shown), thereby rotating the driven member in the same direction as shaft 12. On the other hand, if the drum 67 is connected to the annulus 26 and is then held stationary the rollers will not revolve around the axis of the disks and shaft but will rotate disk 15 in the opposite direction to that of the disk 10 and shaft 12. The driven member (not shown) may therefore be rotated in the same direction as the disk 15 through any suitable connection therewith, not shown.

If while the rollers are revolving in planetary fashion (and with them the rings 37 and 39 and the adjusting arms 42, 43) the collar 44 be shifted axially the cam action of the arms on the crossed edges 38, 40 will give the two rings a relative movement of rotation, thereby rocking the rockers 28 on their pivotal connection with the spider arms 25. Evidently a like actuation of the rings 37, 39 and rockers 28 will be produced by like movement of the collar 44 and arms 42, 43 when the rollers are operating in the non-planetary manner.

If, now, the rocker pivots are located as indicated at 27a in Fig. 4, in which the radii f (shown in dotted lines) from the rocker pivots to the trunnions 32 are substantially at right angles to the axes n—n of the roller carriers (which axes may be conveniently termed the axes of precession of the carriers and rollers), it will be evident that the movement of the carriers produced by the rocking movement of the rockers will be substantially in line with or parallel with the axes n—n, with but little if any tilting movement of the carriers. On the other hand, if the rocker pivots are so located as to make the angles between the radii f and the axes n—n greater than 90°, as in Figs. 2 and 5, for example, in which the rocker pivot is shown at 27, the carriers will have greater tilting movement (in the plane of their axes of precession) and less rectilinear movement. Finally, if the rocker pivots are located at the intersection of the axes n—n, as in Fig. 6, for example, in which the pivot shown is designated 27b, so that the angles between the radii f and the axes n—n are zero, the movement of the carriers will have a maximum tilt and a minimum displacement component. In any case, however, the movement of the carriers while either disk is rotating will cause the rollers to rock, or "precess", on the axes n—n in one direction or the other according to the direction of the rocking movement of the associated rockers, as is well understood in the art.

If desired the carrier axes may be inclined to the planes of the disks. For example, in Fig. 3 the axis of the carrier 23 is so inclined, due to the fact that the bearings 24 of the carrier pivots in the trunnion blocks 33 are offset from the centers of the latter. Inclining the axes of the carriers (which in the construction shown are also the axes of precession) is an advantageous feature, since it causes the precession of the rollers to cease automatically when the precession has proceeded to an extent corresponding to the extent of the rocking movement (of the rockers) which caused or initiated the precession. In other words, the angular extent of the precession is proportional to the angular extent of the movement of the rockers, which latter movement is in turn proportional to the axial movement of the arm 46, collar 44, and arms 42, 43; though the relation stated is not necessarily linear. This effect of inclining the carrier axes or axes of precession is fully explained in my copending application above mentioned, to which reference may be had for such explanation, and it is therefore unnecessary to repeat the same here.

It will also be observed that the axes of precession are at all times determined in position by the roller supporting means, comprising, in the specific construction illustrated, the rockers and carriers.

As stated above, the energy or force necessary to shift the rollers in line with, or parallel with, their axes of precession to produce a desired amount of precessional adjustment is greater than that required to tilt the rollers for the same degree of precession. Also, as explained in my above mentioned copending application, reaction of the load connected with the driven member is exerted on the rollers and, in general, tends to shift the rollers in line with or parallel with their axes of precession, thus tending to cause the rollers to precess to lower speed-ratio positions. Upon reference to Figs. 4, 5 and 6 it will be seen that the maximum response to load reaction in the specific constructions illustrated is obtained when the rollers have the minimum tilting movement, as in Fig. 4, for instance, in which the rocker pivot is so located that the radii $f, f$ are at right angles to the axes of precession $n$—$n$, and that as the rocker pivots are moved out the response decreases, reaching a minimum when the pivots are at the intersections of the axes of precession, as in Fig. 6.

It is to be understood that the invention is not limited to the construction herein specifically illustrated and described but can be embodied in other forms without departure from its spirit.

I claim—

1. In a transmission mechanism, in combination, friction disks and rollers cooperating therewith, and supporting means by which the rollers are carried for precessional adjustment on axes determined at all times by the roller supporting means and inclined to the disks, said supporting means being adapted for tilting movement of the rollers to cause such adjustment.

2. A transmission mechanism having, in combination, coaxial friction disks provided with grooves of circular cross section in their opposed faces, friction rollers cooperating with the grooves and spaced apart around the axis of the disk, carriers for the rollers adapted to rock on axes transverse to the axes of their respective rollers, rockers cooperating with the carriers to support the same, each rocker cooperating with two carriers, and a support on which the rockers are pivoted at points adapted to cause substantial tilting movement of the carriers when the rockers are rocked.

3. A transmisison mechanism having, in combination, coaxial friction disks provided with grooves of circular cross section in their opposed faces, friction rollers cooperating with the grooves and spaced apart around the axis of the disks, carriers for the rollers adapted to rock on axes transverse to the axes of their respective rollers, rockers cooperating with the carriers to support the same, each rocker cooperating with two carriers, a support on which the rockers are pivoted at points adapted to cause substantial tilting movement of the carriers when the rockers are rocked, and means for actuating the rockers to cause such tilting movement of the carriers.

4. In a transmission mechanism, in combination, coaxial friction disks having toroidal grooves in their opposed faces, friction rollers arranged between the disks and cooperating with said grooves, supporting means between the disks, carriers for the rollers, adapted to precess on axes transverse to the roller axes, and rocking supports for the carriers, mounted on said supporting means to rock on pivots located to give the carriers and rollers substantial tilting movement in the plane of the carriers and a substantial movement substantially parallel with the axes of precession.

5. In a transmission mechanism, in combination, coaxial friction disks having toroidal grooves in their opposed faces, friction rollers between the disks and cooperating with said grooves, supporting means between the disks, carriers for the rollers, adapted to precess on axes transverse to the roller axes, and rocking supports for the carriers, pivoted on said supporting means at points located between the axis of the disks and the intersections of the axes of precession and adapted to give the carriers a substantial tilting movement when the rocking supports are rocked.

6. In a transmission mechanism, in combination, coaxial friction disks having toroidal grooves in their opposed faces, friction rollers between the disks and cooperating with said grooves, supporting means between the disks, carriers for the rollers, adapted to precess on axes transverse to the roller axes, and rocking supports for the carriers, pivoted on said supporting means at the intersections of the axes of precession.

FRANK A. HAYES.